US008600638B2

(12) United States Patent
Kato

(10) Patent No.: US 8,600,638 B2
(45) Date of Patent: Dec. 3, 2013

(54) VEHICLE STABILIZATION CONTROLLING APPARATUS

(75) Inventor: Hidehisa Kato, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 177 days.

(21) Appl. No.: 13/133,535

(22) PCT Filed: Jan. 15, 2009

(86) PCT No.: PCT/JP2009/050487
§ 371 (c)(1),
(2), (4) Date: Jun. 8, 2011

(87) PCT Pub. No.: WO2010/082336
PCT Pub. Date: Jul. 22, 2010

(65) Prior Publication Data
US 2011/0246041 A1  Oct. 6, 2011

(51) Int. Cl.
*G06F 7/70* (2006.01)
(52) U.S. Cl.
USPC .......................................................... 701/70
(58) Field of Classification Search
USPC ................. 701/36, 70, 71, 78, 79, 83, 94
See application file for complete search history.

(56) References Cited

U.S. PATENT DOCUMENTS

| 5,646,849 A | 7/1997 | Walenty et al. |
| 5,671,143 A | 9/1997 | Gräber |
| 6,416,141 B1 | 7/2002 | Zinnkann et al. |
| 7,006,907 B2 | 2/2006 | Usuki et al. |
| 7,308,350 B2 | 12/2007 | Brown et al. |
| 7,409,280 B2 | 8/2008 | Nakamura et al. |
| 7,522,983 B2 | 4/2009 | Hashimoto et al. |
| 7,762,562 B2 | 7/2010 | Sugiyama |
| 2002/0082762 A1 | 6/2002 | Tanaka et al. |
| 2002/0109403 A1 | 8/2002 | Yamamoto et al. |
| 2002/0183911 A1 | 12/2002 | Tashiro et al. |
| 2004/0098185 A1 | 5/2004 | Wang |

(Continued)

FOREIGN PATENT DOCUMENTS

| CN | 101321654 A | 12/2008 |
| EP | 1 388 474 A2 | 2/2004 |

(Continued)

OTHER PUBLICATIONS

International Search Report for International Patent Application No. PCT/JP2009/050487, mailed on Apr. 21, 2009 (w/ English translation).

(Continued)

*Primary Examiner* — Kim T Nguyen
(74) *Attorney, Agent, or Firm* — Oliff & Berridge, PLC

(57) ABSTRACT

When a the brake assist control and a left/right distribution control are performed at the same time, since braking forces, which are equal to or larger than the braking force generated by a brake operation of a driver, are generated to wheels by the brake assist control, in a case where the driver requests a large deceleration, a desired deceleration can be obtained. Further, since a difference is made between the braking forces generated to left/right wheels by the left/right distribution control, in a case where a yaw direction behavior is generated to a vehicle, the yaw direction behavior can be reduced by a difference between the braking forces.

2 Claims, 7 Drawing Sheets

(56) References Cited

U.S. PATENT DOCUMENTS

| | | |
|---|---|---|
| 2005/0075778 A1* | 4/2005 | Inagaki .......................... 701/70 |
| 2006/0267404 A1 | 11/2006 | Yasui et al. |
| 2007/0138861 A1 | 6/2007 | Kawahara et al. |
| 2007/0169007 A1 | 7/2007 | Hashimoto et al. |
| 2007/0282510 A1 | 12/2007 | Nimmo et al. |
| 2008/0007115 A1 | 1/2008 | Mizutani |
| 2008/0215223 A1 | 9/2008 | Yamada et al. |
| 2008/0300764 A1 | 12/2008 | Kato et al. |
| 2009/0012685 A1 | 1/2009 | Maeda et al. |
| 2009/0051216 A1* | 2/2009 | Maeda et al. ................. 303/146 |
| 2009/0072615 A1* | 3/2009 | Oosawa et al. ............ 303/113.1 |
| 2009/0118905 A1 | 5/2009 | Takenaka et al. |
| 2010/0106374 A1 | 4/2010 | Miyajima et al. |
| 2011/0125368 A1 | 5/2011 | Yokota |
| 2011/0241418 A1 | 10/2011 | Nozawa et al. |
| 2011/0246041 A1 | 10/2011 | Kato |
| 2012/0074770 A1 | 3/2012 | Lee |

FOREIGN PATENT DOCUMENTS

| | | |
|---|---|---|
| JP | A-2002-127887 | 5/2002 |
| JP | A-2006-213141 | 8/2006 |
| JP | A-2006-240395 | 9/2006 |
| JP | A-2006-298211 | 11/2006 |
| JP | A-2007-513002 | 5/2007 |
| JP | A-2008-254724 | 10/2008 |
| WO | WO 2006/006453 A1 | 1/2006 |
| WO | WO 2006/093246 A1 | 9/2006 |

OTHER PUBLICATIONS

Apr. 12, 2012 Office Action issued in U.S. Appl. No. 13/001,153.
Oct. 19, 2012 Office Action issued in U.S. Appl. No. 13/001,153.
Aug. 22, 2013 Office Action issued in U.S. Appl. No. 13/001,153.

* cited by examiner

VEHICLE STABILIZATION CONTROLLING APPARATUS

TECHNICAL FIELD

The present invention relates to a vehicle stabilization controlling apparatus. In particular, the present invention relates to a vehicle stabilization controlling apparatus capable of securing stability when a vehicle is braked.

BACKGROUND ART

In vehicle stabilization controlling apparatuses of related art, there is a vehicle stabilization controlling apparatus which secures stability when a vehicle travels by controlling braking forces generated to wheels and controlling the braking forces of the vehicle depending on the state of the vehicle when the vehicle travels regardless of the intention of a driver while the vehicle travels. For example, in the vehicle braking force control device described in Patent Document 1, in a case where a wheel is locked in braking process, the wheel is suppressed from being locked by reducing the hydraulic pressure applied to a wheel-cylinder which generates a braking force to the wheel being locked, and further in a case where a yaw direction behavior control is performed, the yaw direction behavior control is performed by making the decelerations on the left and right sides of the vehicle different by performing a braking force distribution control of left and right wheels.

Further, in the vehicle braking force control device described in Patent Document 1, in a case where a braking force increase suppression control such as a yaw direction behavior control and the like, which is performed by adjusting the braking forces of respective wheels, is started while a brake assist control, which is a control for generating a braking force larger than the braking force generated by the depression force of a driver, is performed, a brake source pressure, which is a source of pressure applied to a wheel-cylinder in a brake control, is more suppressed in comparison with the case in which only the brake assist control is performed. With the operation, since it can be suppressed that the brake source pressure, which is increased by the brake assist control, is unnecessarily increased, an energy efficiency in the braking process can be improved and a brake pressure can be accurately adjusted Patent Document 1: International Publication No. WO 2006/006453 (pamphlet)

DISCLOSURE OF INVENTION

Problem to be Solved by the Invention

However, in a case where the brake assist control and the yaw direction behavior control are performed at the same time, since the braking forces of the wheels are controlled by both the brake assist control and the yaw direction behavior control, the braking forces of the left/right wheels may be different from the distribution of the braking forces by the yaw direction behavior control. Therefore, the yaw direction behavior control may not be effectively performed. Further, in the state that the brake assist control and the yaw direction behavior control are performed at the same time, in a case where the ratio of increase of a braking force by the brake assist control is reduced for the purpose of more securely performing the yaw direction behavior control, a braking force may become insufficient and a deceleration requested by the driver may not be obtained.

As described above, in a case where the brake assist control and the yaw direction behavior control are performed at the same time, it is very difficult to satisfy securing of stability by the yaw direction behavior control when a vehicle travels and securing of a deceleration by the brake assist control together.

An object of the present invention, which was made in view of the above circumstances, is to provide a vehicle stabilization controlling apparatus capable of more reliably securing stability and securing a deceleration at the same time when a vehicle travels.

Solutions To The Problems

In order to solve the above mentioned problem and achieve the object, a vehicle stabilization controlling apparatus according to the present invention includes a yaw direction behavior estimating means that estimates a yaw direction behavior of a vehicle; a brake means capable of generating braking forces to wheels provided with the vehicle by a brake operation of a driver; and a brake means control means that is disposed capable of controlling the braking forces by controlling the brake means as well as performs a brake assist control that is a control for generating the braking forces equal to or larger than the braking force generated by the brake operation when the brake operation is performed at an operation speed equal to or larger than a predetermined change speed, performs a left/right distribution control that is a control for reducing the yaw direction behavior by making a difference between the braking forces generated to left/right wheels when the yaw direction behavior estimated by the yaw direction behavior estimating means is equal to or larger than a predetermined behavior, and further performs a control for generating a braking force equal to or larger than the braking force generated by the brake operation in a state where the difference between the braking forces generated to the left/right wheels is made a predetermined difference when the brake assist control and the left/right distribution control are performed at the same time.

Further, in the vehicle stabilization controlling apparatus according to the present invention, the brake means is disposed capable of generating the braking forces by changing hydraulic pressures of an operating fluid, and the brake means control means is disposed capable of controlling the braking forces by controlling the hydraulic pressures of the operating fluid as well as generates the braking forces equal to or larger than the braking force generated by the brake operation by increasing the hydraulic pressure that changes in response to the brake operation when the brake assist control is performed, makes a difference between the braking forces generated to the left/right wheels by making a difference between the hydraulic pressure that generates the braking force to the left side wheel and the hydraulic pressure that generates the braking force to the right side wheel in the left/right wheels when the left/right distribution control is performed, and further makes pressure increasing gradients when the hydraulic pressures are increased to the same pressure increasing gradient in the hydraulic pressure for generating the braking force to the left side wheel and in the hydraulic pressure for generating the braking force to the right side wheel when the brake assist control and the left/right distribution control are performed at the same time.

Further, in the vehicle stabilization controlling apparatus according to the present invention, when the brake assist control and the left/right distribution control are performed at the same time, after the hydraulic pressure, which generates the braking force to one of the left/right wheels in hydraulic pressures for generating the braking forces to the wheels, is reduced, the brake means control means makes the pressure increasing gradients of the hydraulic pressures for generating the braking forces to the left/right wheels to a same gradient.

In order to solve the above mentioned problem and achieve the object, a vehicle stabilization controlling apparatus according to the present invention includes a yaw direction behavior estimating means that estimates a yaw direction behavior of a vehicle; a brake means capable of generating braking forces to wheels provided with the vehicle by a brake operation of a driver as well as generating the braking forces by changing hydraulic pressures of an operating fluid; and a brake means control means that is disposed capable of controlling the braking forces generated to the wheels by the brake means by controlling the hydraulic pressures of the operating fluid as well as performs a brake assist control that is a control for performing by determining a gradient when the hydraulic pressures of the brake fluid are changed as a pressure increasing gradient equal to or larger than the gradient when the hydraulic pressure is increased by the brake operation when the brake operation is performed at an operation speed equal to or larger than a predetermined change speed, and performs a left/right distribution control that is a control for reducing the yaw direction behavior by making a difference between the hydraulic pressures for generating the braking forces to the left/right wheels when the yaw direction behavior estimated by the yaw direction behavior estimating means is equal to or larger than a predetermined behavior, wherein the hydraulic pressure, that generates the braking force to one of the left/right wheels in the hydraulic pressures for generating the braking forces to the wheels, is determined to the pressure increasing gradient in the brake assist control and the hydraulic pressure for generating the braking force to the other wheel is controlled based on the determined pressure increasing gradient after the hydraulic pressures is reduced when the brake assist control and the left/right distribution control are performed at the same time.

EFFECT OF THE INVENTION

The vehicle stabilization controlling apparatus according to the present invention can achieve an effect that secures stability and secures deceleration can be established at the same time when a vehicle travels.

EXPLANATIONS OF LETTERS OR NUMERALS

Figure 1:
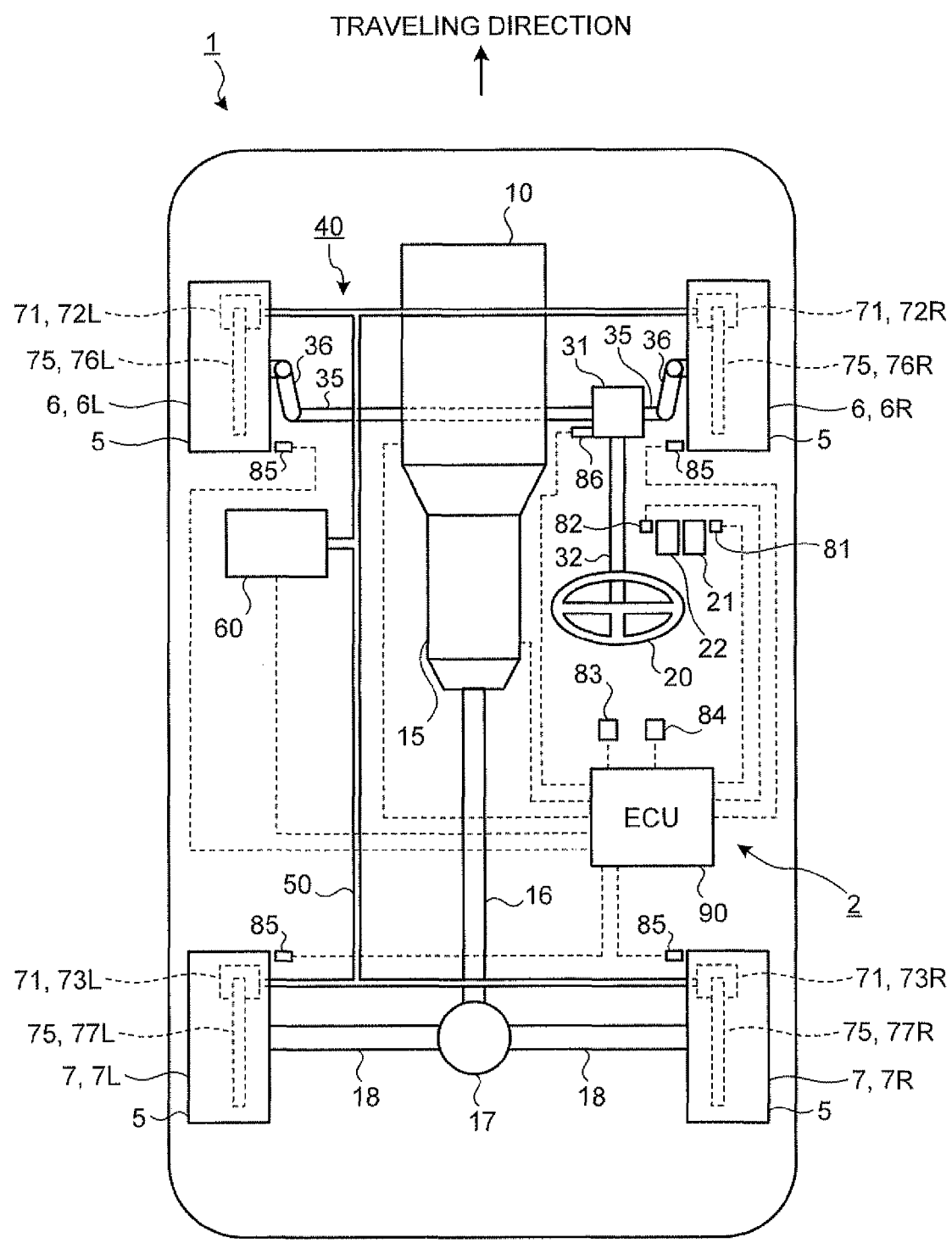
FIG. 1 is a schematic view of a vehicle provided with a vehicle stabilization controlling apparatus according to an embodiment of the present invention.

1 Vehicle
2 Vehicle stabilization controlling apparatus
5 Wheel
6 Front wheel
7 Rear wheel
10 Engine
20 Steering wheels
21 Accelerator pedal
22 Brake pedal
40 Brake device
41 Master cylinder
50 Hydraulic pressure path
51 First hydraulic pressure path
52 Second hydraulic pressure path
55 Return path
56 Supply path
60 Brake actuator
61 Master cut valve
62 Hold valve
63 Pressure reduction valve
64 Pressurization pump
66 Drive motor
69 Master cylinder pressure sensor
71 Wheel-cylinder
75 Brake disc
82 Brake stroke sensor
83 Yaw rate sensor
85 Wheel speed sensor
86 Rudder angle sensor
90 ECU
91 Processing unit
92 Accelerator opening degree obtaining unit
93 Brake stroke amount obtaining unit
94 Rudder angle obtaining unit
95 Wheel speed obtaining unit
96 Yaw rate obtaining unit
97 G obtaining unit
98 Yaw direction behavior estimating unit
99 Engine control unit
100 Brake device control unit
101 Brake assist determining unit
102 Yaw direction behavior control determining unit
103 Brake determining unit
110 Storage unit
111 Input/output unit

BEST MODE(S) FOR CARRYING OUT THE INVENTION

An embodiment of a vehicle stabilization controlling apparatus according to the present invention will be explained below in detail based on the drawings. Note that the present invention is by no means limited by the embodiment. Further, the components in the embodiment include the components which can be easily replaced by a person skilled in the art and which are substantially the same components.

Embodiment

FIG. 1 is a schematic view of a vehicle to which a stabilization controlling apparatus according to an embodiment of the present invention is disposed. A vehicle 1 which is disposed with a vehicle stabilization controlling apparatus 2 according to the embodiment uses an engine 10 which is an internal combustion engine as a power generating means, and can travel by transmitting the power generated by the engine 10 to rear wheels 7 disposed as drive wheels in wheels 5 provided with the vehicle 1 via an automatic transmission 15. Further, in the engine 10, the number of revolutions of engine and torque (output) are controlled by an ECU (Electronic Control Unit) 90 which controls the respective portions of the vehicle 1.

Note that, in the embodiment, although the engine 10 is a reciprocation type spark ignition engine using gasoline as a fuel, the engine 10 is not limited thereto. The engine 10 may be, for example, a spark ignition engine using LPG (Liquefied Petroleum Gas) and alcohol as a fuel or may be a so-called rotary type spark ignition engine and may be a diesel engine. Further, the power generating means may be other than the internal combustion engine and may be, for example, a motor driven by electricity and a motor and engine used together.

The engine 10 as the power generating means is mounted in a front side portion of the vehicle 1 in a traveling direction, and drives the rear wheels 7 via the automatic transmission 15, a propeller shaft 16, a differential gear 17, and drive shafts 18. In the rear wheels 7, a left rear wheel 7L, which is a rear wheel 7 on a left side in the traveling direction of the vehicle 1 and a right rear wheel 7R, which is a rear wheel 7 on a right side in the traveling direction of the vehicle 1 are connected to the drive shafts 18 together and disposed as drive wheels together. As described above, the vehicle 1 provided with the vehicle stabilization controlling apparatus 2 according to the embodiment is configured as a so-called FR (Front engine Rear drive) drive type in which the engine 10 is mounted in the front side portion in the traveling direction of the vehicle 1 and the rear wheels 7 are disposed as the drive wheels. Note that the vehicle stabilization controlling apparatus 2 according to the embodiment can be applied to any vehicle regardless of a drive type as long as the vehicle is the vehicle 1 in which the power generated by the power generating means is transmitted to the drive wheels. Further, a transmission for changing the rotation speed of the engine 10 may be other than the automatic transmission 15 and may be, for example, a manual transmission for manually changing the rotation speed.

In the wheels 5 provided with the vehicle 1, the rear wheels 7 are disposed as the drive wheels as described above, whereas front wheels 6 are disposed as wheels to be steered by the vehicle 1. The front wheels 6 as the wheels to be steered are disposed such that they can be steered by a steering wheel 20 disposed to a driver's seat of the vehicle 1. The steering wheel 20 is connected to an EPS (Electric Power Steering) unit 31, which is a steering assist device for generating a steering assist force when a driver of the vehicle 1 steers the wheels 5 via a steering shaft 32. As described above, since the steering wheel 20 is connected to the EPS unit 31, the front wheels 6 can be steered by operating the steering wheel 20. That is, among the front wheels 6, a left front wheel 6L, which is a front wheel 6 positioned on the left side of the vehicle 1 in the traveling direction and a right front wheel 6R, which is a front wheel 6 positioned on the right side of the vehicle 1 in the traveling direction are connected to the EPS unit 31 via a tie-rod 35 and a knuckle arm 36 together, respectively so that the left front wheel 6L and the right front wheel 6R are disposed so as to be steered by operating the steering wheel 20. Further, the EPS unit 31 is disposed with a rudder angle sensor 86 which is a rudder angle detecting means for detecting a rudder angle as the rotation angle of the steering wheel 20.

Further, the vehicle 1 is disposed with a brake device 40, which generates a braking force to the wheels 5, and wheel-cylinders 71, which are provided with the brake device 40 and operated by a hydraulic pressure, and brake discs 75, which are disposed in combination with the wheel-cylinders 71 as well as rotated integrally with the wheels 5 when the wheels 5 rotate, are disposed in the vicinity of the respective wheels 5. That is, in the wheel-cylinders 71, the wheel-cylinders 71, which are disposed in the vicinities of the left front wheel 6L, the right front wheel 6R, the left rear wheel 7L, and the right rear wheel 7R are sequentially disposed as a left front wheel wheel-cylinder 72L, a right front wheel wheel-cylinder 72R, a left rear wheel wheel-cylinder 73L, and a right rear wheel wheel-cylinder 73R. Likewise, in the brake discs 75, the brake discs 75, which are disposed in the vicinities of the left front wheel 6L, the right front wheel 6R, the left rear wheel 7L, and the right rear wheel 7R are sequentially disposed as a left front wheel brake disc 76L, a right front wheel brake disc 76R, a left rear wheel brake disc 77L, and a right rear wheel brake disc 77R.

Among them, the wheel-cylinders 71 are connected to a hydraulic pressure path 50 as a path of a hydraulic pressure which is applied to the wheel-cylinders 71 when the vehicle 1 is braked. The hydraulic pressure path 50 is disposed with a brake actuator 60 which can control the hydraulic pressure in the hydraulic pressure path 50 when the vehicle 1 is braked, and the brake actuator 60 can independently apply the hydraulic pressures which are applied to the wheel-cylinders 71, respectively. With the operation, the braking forces of the wheels 5 can be independently generated, respectively.

Further, wheel speed sensors 85 which are wheel speed detecting means for detecting wheel speeds as the rotation speeds of the wheels 5 are disposed in the vicinities of the wheels 5. The wheel speed sensors 85 are independently disposed to the wheels 5 and can independently detect the wheel speeds of the wheels 5.

Further, the vehicle 1 is disposed together with an accelerator pedal 21, which is operated when the output of the engine 10 is adjusted, and a brake pedal 22, which is operated when the vehicle 1 is braked while it travels in the vicinity of a foot of the driver in the state that the driver sits on the driver's seat of the vehicle 1. Among them, an accelerator opening degree sensor 81 which is an accelerator opening degree detecting means capable of detecting an opening degree of the accelerator pedal 21 is disposed in the vicinity of the accelerator pedal 21. Further, the brake pedal 22 is connected to the hydraulic pressure path 50 via a master cylinder 41 (refer to FIG. 2) to be described later, and the like, and further a brake stroke sensor 82 which is a brake stroke detecting means capable of detecting a stroke of the brake pedal 22 is disposed in the vicinity of the brake pedal 22.

The brake device 40 can generate a braking force to the wheels 5 by performing a brake operation to depress the brake pedal 22 by the driver of the vehicle 1. As described above, the brake device 40 is disposed as a brake means capable of generating a braking force to the wheels 5 provided with the vehicle 1 by at least the brake operation of the driver.

Further, the vehicle 1 is disposed with a G sensor 84 capable of detecting an acceleration in at least a width direction of the vehicle 1 and a yaw rate sensor 83 which is a yaw rate detecting means capable of detecting a yaw rate when the vehicle 1 travels. The accelerator opening degree sensor 81, the brake stroke sensor 82, the yaw rate sensor 83, the G sensor 84, the wheel speed sensors 85, the rudder angle sensor 86, the EPS unit 31, the brake actuator 60, the engine 10, and the automatic transmission 15 are connected to the ECU 90 which control the respective portions of the vehicle 1 and disposed so as to be controlled by the ECU 90.

Figure 2:
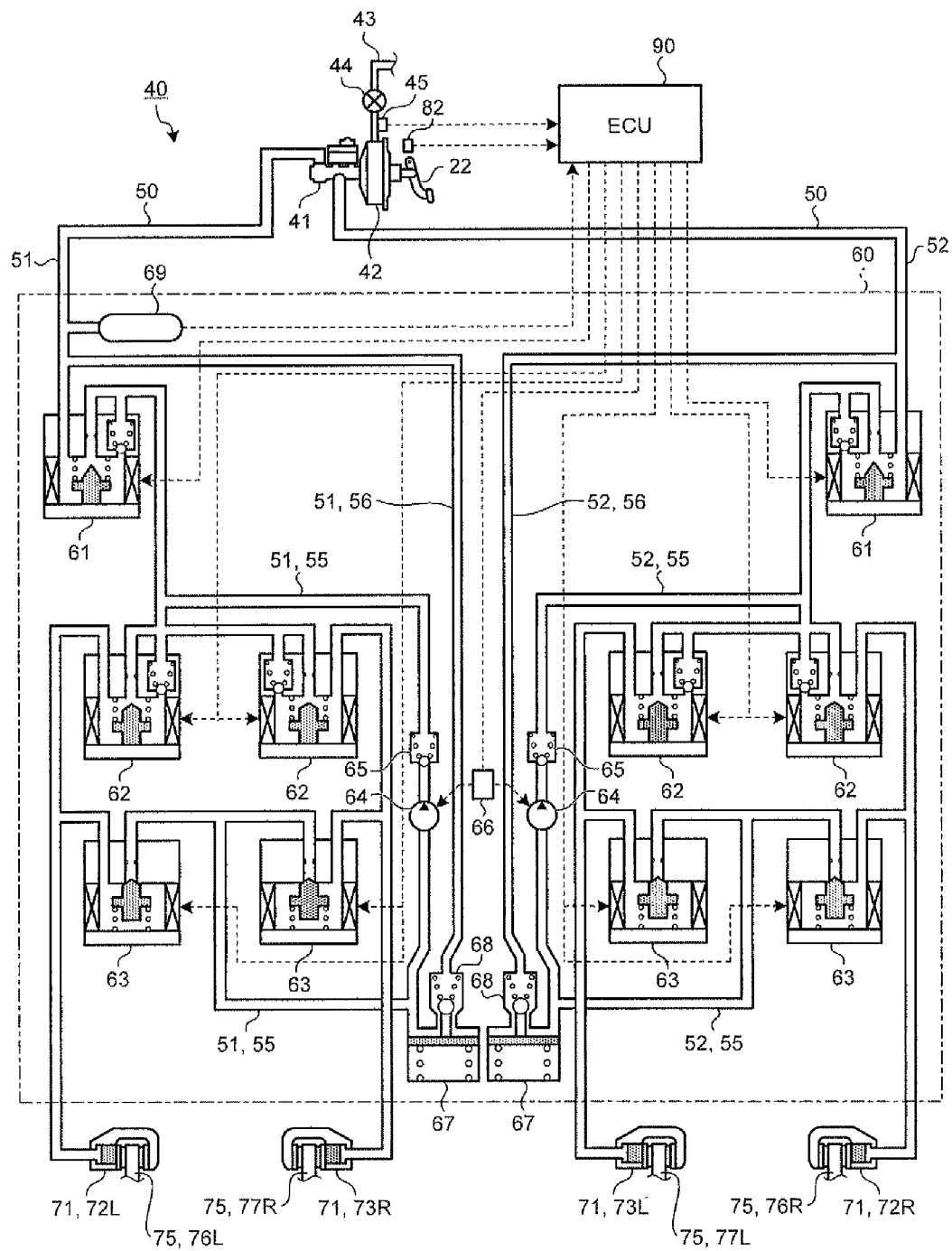
FIG. 2 is a configuration schematic view of a brake device shown in FIG. 1.

FIG. 2 is a configuration schematic view of the brake device shown in FIG. 1. The brake pedal 22, which is operated when the vehicle 1 (refer to FIG. 1) is braked is connected to a brake booster 42, to which a negative pressure path 43 capable of transmitting a negative pressure generated when the engine 10 is operated by being connected to a suction path (illustration is omitted) of the engine 10 (refer to FIG. 1). The negative pressure path 43 connected to the brake booster 42 as described above is disposed with a negative pressure path check valve 44 which is a check valve for shutting off a flow of air in the direction of the brake booster 42 from the suction path side and a negative pressure sensor 45 which is a negative pressure detecting means capable of detecting a negative pressure in the negative pressure path 43.

Further, the brake booster 42 is connected to the master cylinder 41 capable of generating a hydraulic pressure, and the hydraulic pressure path 50 is connected to the master cylinder 41. The hydraulic pressure path 50 connected to the master cylinder 41 as described above is filled with a brake fluid (illustration is omitted) used as operating fluid, and the brake device 40 is disposed to capable of generating a braking force to the wheels 5 by changing the hydraulic pressure of the brake fluid. Further, the hydraulic pressure path 50 is configured by being separated into two systems, and a first hydraulic pressure path 51 and a second hydraulic pressure path 52, which are the hydraulic pressure paths 50 of the two systems, are independently connected to the master cylinder 41, respectively.

The brake pedal 22 is connected to the hydraulic pressure path 50 via the brake booster 42 and the master cylinder 41 as described above. Among them, the brake booster 42 is configured as a known vacuum servo unit which can increase the depression force input to the brake pedal 22 making use of the difference between the negative pressure transmitted from the negative pressure path 43 and the atmospheric pressure and transmits the increased depression force to the master cylinder 41. Further, the master cylinder 41 is disposed to generate the hydraulic pressure by the force transmitted from the brake booster 42 and transmits the generated hydraulic pressure to the hydraulic pressure path 50.

Further, the hydraulic pressure path 50, which is connected to the master cylinder 41, is connected with the wheel-cylinders 71 at its ends, and the wheel-cylinders 71 disposed in the vicinity of the wheels 5, which are disposed at the alternate positions in the vehicle 1 are connected by the first hydraulic pressure path 51 and the second hydraulic pressure path 52. That is, the first hydraulic pressure path 51 is connected with the left front wheel wheel-cylinder 72L and the right rear wheel wheel-cylinder 73R, and the second hydraulic pressure path 52 is connected with the right front wheel wheel-cylinder 72R and the left rear wheel wheel-cylinder 73L.

Further, the hydraulic pressure path 50 is disposed with plural sets of the brake actuators 60 which can control the hydraulic pressure in the hydraulic pressure path 50 when the vehicle is braked, and the brake actuators 60 include master cut valves 61 and hold valves 62 which are normally-open solenoid valves and pressure reduction valves 63 which are normally-closed solenoid valves. The master cut valves 61, the hold valves 62, and the pressure reduction valves 63 are disposed as a braking force distribution control means capable of controlling the distribution of braking force applied to the wheels 5. Among these valves, each one of the master cut valves 61 is disposed to the first hydraulic pressure path 51 and the second hydraulic pressure path 52.

Further, the hold valves 62 are disposed in the paths from the master cylinder 41 to the wheel-cylinders 71 via the master cut valves 61 in the hydraulic pressure path 50, and four sets of the hold valves 62 are also disposed corresponding to four sets of the wheel-cylinders 71.

Further, the pressure reduction valves 63 are disposed to return paths 55 which are the paths branched from the paths toward the wheel-cylinders 71 from the hold valves 62 and connected to the paths between the master cut valves 61 and the hold valves 62. As described above, since the return paths 55, to which the pressure reduction valves 63 are disposed, are branched from the paths between the four hold valves 62 and the four wheel-cylinders 71, respectively and the pressure reduction valves 63 are disposed to the respective branched paths, four sets of the pressure reduction valves 63 are disposed to the hydraulic pressure path 50. That is, the four sets of the pressure reduction valves 63 are disposed corresponding to the four wheel-cylinders 71 likewise the hold valves 62.

Further, in the portions of the return paths 55 on the downstream side of the pressure reduction valves 63, that is, in the portions on the sides where the return paths 55 are connected to the paths between the master cut valves 61 and the hold valves 62 and located nearer than the pressure reduction valves 63, the two return paths 55 in the first hydraulic pressure path 51 are connected to each other, and the two return paths 55 in the second hydraulic pressure path 52 are connected to each other and are configured as one paths, respectively. The portions of the return paths 55, which are configured as the one paths as described above, are disposed with pressurization pumps 64 which are the brake actuators 60 and return path check valves 65 which are check valves disposed to the return paths 55, and the return path check valves 65 are disposed on the sides where the return path check valves 65 are connected to the paths between the master cut valves 61 and the hold valves 62 and located nearer than the pressurization pumps 64.

Among them, the pressurization pumps 64 are connected with a drive motor 66 and operated by the drive motor 66 so that the brake fluid in the return paths 55 can be supplied from the pressure reduction valves 63 side to the master cut valves 61 sides or to the hold valves 62 side. Further, the return path check valves 65 permit the brake fluid to flow only in the direction of the master cut valves 61 or the hold valves 62 from the pressurization pumps 64 and shut off the flow of the brake fluid in an opposite direction. Since the pressurization pumps 64 and the return path check valves 65 are disposed as described above, each one of them is disposed to the first hydraulic pressure path 51 and the second hydraulic pressure path 52, respectively, and thus each two sets of the pressurization pumps 64 and the return path check valves 65 are disposed in total.

Further, supply paths 56, which are the paths connected to the return paths 55, are branched from the upstream sides of the master cut valves 61 in the hydraulic pressure path 50, that is, from the portions between the master cylinder 41 and the master cut valves 61 in the hydraulic pressure path 50, and the supply paths 56 are connected to the return paths 55. Further, the supply paths 56 are disposed with reservoirs 67, and supply path check valves 68, which are check valves disposed to the supply paths 56, and the supply path check valves 68 are disposed on the sides where the supply path check valves 68 are connected to the paths between the master cylinder 41 and the master cut valves 61 in the supply paths 56 nearer than the reservoirs 67.

Among them, the reservoirs 67 are disposed to reserve the brake fluid which flows in the supply paths 56 in a predetermined amount, and the supply path check valves 68 permit only the brake fluid to flow in the direction of the return paths 55 from the master cut valves 61 sides or the hold valves 62 sides and shut off the flow of the brake fluid in an opposite direction. Since the reservoirs 67 and the supply path check valves 68 are disposed as described above, each one of the reservoirs 67 and each one of the supply path check valves 68 are disposed to the first hydraulic pressure path 51 and the second hydraulic pressure path 52, respectively, that is, each two sets of them are disposed.

Further, a master cylinder pressure sensor 69 which is an operation pressure detecting means is disposed between the master cylinder 41 and the master cut valve 61 in the first hydraulic pressure path 51. The master cylinder pressure sensor 69 is disposed to detect the hydraulic pressure between the master cylinder 41 and the master cut valve 61 in the first hydraulic pressure path 51 as the operation pressure generated when the driver performs a brake operation and depresses the brake pedal 22.

The negative pressure sensor 45, the master cylinder pressure sensor 69, the master cut valves 61, the hold valves 62, the pressure reduction valves 63, and the drive motor 66 disposed as described above are connected to the ECU 90 and disposed so as to be controlled by the ECU 90.

Figure 3:
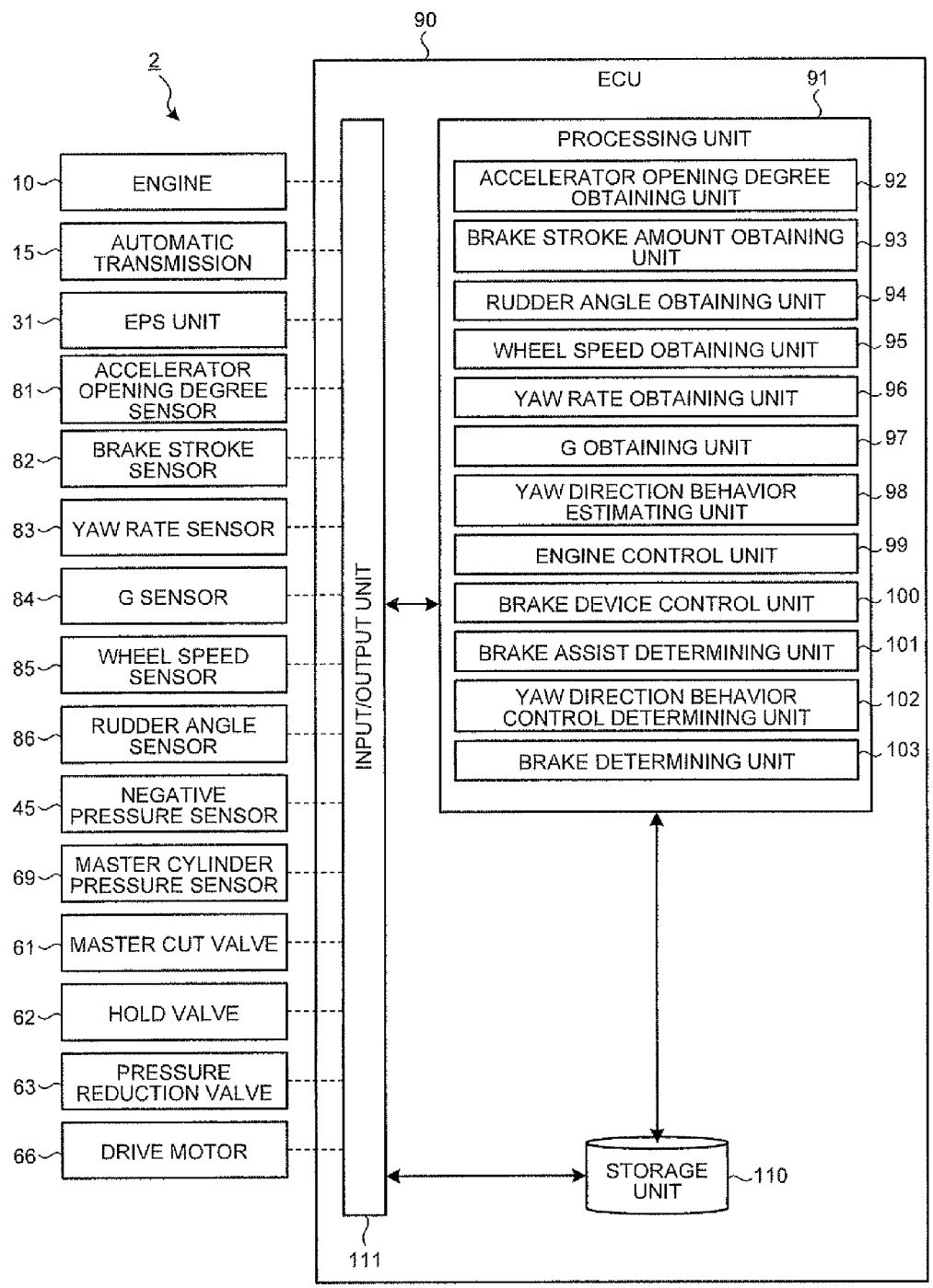
FIG. 3 is a main portion configuration view of the vehicle stabilization controlling apparatus shown in FIG. 1.

FIG. 3 is a main portion configuration view of the vehicle stabilization controlling apparatus shown in FIG. 1. The ECU 90 is disposed with a processing unit 91, a storage unit 110, and an input/output unit 111 which are connected to each other so as to deliver a signal therebetween. Further, the engine 10, the automatic transmission 15, the EPS unit 31, the accelerator opening degree sensor 81, the brake stroke sensor 82, the yaw rate sensor 83, the G sensor 84, the wheel speed sensors 85, the rudder angle sensor 86, the negative pressure sensor 45, the master cylinder pressure sensor 69, the master cut valves 61, the hold valves 62, the pressure reduction valves 63, the drive motor 66, which are connected to the ECU 90, are connected to the input/output unit 111 which inputs and outputs an signal between the sensors and the like.

Further, the storage unit 110 stores a computer program for controlling the vehicle stabilization controlling apparatus 2 according to the embodiment. The storage unit 110 can be constituted by a hard disc device and a magnetic optical disc device, or a non-volatile memory such as a flash memory, and the like (read-only storage medium such as CD-ROM and the like), and a volatile memory such as RAM (Random Access Memory), or a combination of these devices.

Further, the processing unit 91 is constituted by a memory and a CPU (Central Processing Unit) and includes an accelerator opening degree obtaining unit 92 which is an accelerator operation obtaining means capable of obtaining an accelerator opening degree from the result of detection in the accelerator opening degree sensor 81, a brake stroke amount obtaining unit 93 which is a brake operation obtaining means capable of obtaining a stroke amount of the brake pedal 22 from the result of detection in the brake stroke sensor 82, a rudder angle obtaining unit 94 which is a rudder angle obtaining means capable of obtaining a rudder angle as the rotation angle of the steering wheel 20 from the result of detection in the rudder angle sensor 86, wheel speed obtaining units 95 which are wheel speed obtaining means capable of obtaining wheel speeds from the results of detection by the wheel speed sensors 85, a yaw rate obtaining unit 96 which is a yaw rate obtaining means capable of obtaining a yaw rate when the vehicle 1 travels from the result of detection by the yaw rate sensor 83, a G obtaining unit 97 which is a G obtaining means capable of obtaining a lateral G when the vehicle 1 travels from the result of detection by the G sensor 84, and a yaw direction behavior estimating unit 98 which is a yaw direction behavior estimating means for estimating a yaw direction behavior of the vehicle 1.

Further, the processing unit 91 includes an engine control unit 99 which is an engine control means capable of controlling an operation state of the engine 10, a brake device control unit 100 which is a brake means control means capable of controlling a braking force generated to the wheels 5 by controlling the hydraulic pressure of the brake fluid by controlling the brake device 40, a brake assist determining unit 101 which is a brake assist determining means for determining whether or not a brake assist control, which is a brake assist control for generating a braking force equal to or larger than the braking force generated by a brake operation of the driver by increasing the hydraulic pressure of the brake fluid which changes in response to the brake operation, a yaw direction behavior control determining unit 102 which is a yaw direction behavior control determining means for determining whether or not a yaw direction behavior control is performed, and a brake determining unit 103 as a brake determining means for determining whether or not a braking operation is being performed.

In the control of the master cut valves 61 and the like controlled by the ECU 90, the processing unit 91 reads the computer program into a memory assembled to the processing unit 91 and calculates the computer program based on, for example, the results of detection by the yaw rate sensor 83 and the like and controls the master cut valves 61 and the like by operating the master cut valves 61 and the like in response to a result of calculation. At the time, the processing unit 91 appropriately stores a numerical value being calculated in the storage unit 110 and fetches the stored numerical value and performs the calculation of the fetched numerical value. Note that in a case where the master cut valves 61 and the like are controlled as described above, they may be controlled by dedicated hardware different from the ECU 90 in place of the computer program.

The vehicle stabilization controlling apparatus 2 according to the embodiment is configured as described above, and an operation of the vehicle stabilization controlling apparatus 2 will be explained below. When the vehicle 1 travels, the vehicle is caused to travel by operating the engine 10 and transmitting the power of the engine 10 to the rear wheels 7 which are the drive wheels. More Specifically, while the engine 10 is in operation, the rotation of a crank shaft (illustration is omitted) provided with the engine 10 is transmitted to the automatic transmission 15 and changed at a transmission gear ratio suitable for the travelling state of the vehicle 1 by the automatic transmission 15. The rotation changed by the automatic transmission 15 is transmitted to the rear wheels 7 via the propeller shaft 16, the differential gear 17, and the drive shafts 18. With the operation, the rear wheels 7, which are the drive wheels, are rotated, and the vehicle 1 travels.

Further, the vehicle speed of the vehicle 1, which is caused to travel by transmitting the rotation of the engine 10 to the rear wheels 7, is adjusted by adjusting the number of revolutions and the output of the engine 10 by operating the accelerator pedal 21 by the driver by foot. In a case where the accelerator pedal 21 is operated, a stroke amount of the accelerator pedal 21, that is, a accelerator opening degree is detected by the accelerator opening degree sensor 81 disposed in the vicinity of the accelerator pedal 21. The result of detection by the accelerator opening degree sensor 81 is transmitted to the accelerator opening degree obtaining unit 92 provided with the processing unit 91 of the ECU 90 and obtained by the accelerator opening degree obtaining unit 92, and further the obtained accelerator opening degree is transmitted to the engine control unit 99 provided with the processing unit 91 of the ECU 90. The engine control unit 99 controls the engine 10 based on the accelerator opening degree obtained by the accelerator opening degree obtaining unit 92 and the results of detection by the other sensors.

Although the vehicle 1 travels by operating the engine 10 as described above, when the vehicle 1 travels, the wheel speeds as the rotation speeds of the wheels 5 are detected by the wheel speed sensors 85. The wheel speeds detected by the wheel speed sensors 85 are transmitted to the wheel speed obtaining unit 95 provided with the processing unit 91 of the ECU 90 and obtained by the wheel speed obtaining unit 95. When the wheel speeds are obtained by the wheel speed obtaining unit 95, the results of detection are independently obtained by the four wheel speed sensors 85. That is, the wheel speed obtaining unit 95 independently obtains the wheel speeds of the four wheels 5, respectively.

Further, in a case where the vehicle speed is reduced at a reducing speed equal to or larger than the reduction of speed caused by returning the accelerator pedal 21 while the vehicle 1 travels, the vehicle 1 is braked by depressing the brake pedal 22. As described above, in a case where the brake operation is performed by depressing the brake pedal 22, the depression force is transmitted to the brake booster 42. Here, the negative pressure path 43 is connected to the brake booster 42, and a negative pressure, which is generated in a suction stroke when the engine 10 is in operation can be transmitted to the brake booster 42 via the negative pressure path 43. Therefore, in a case where the depression force is input to the brake booster 42, the brake booster 42 inputs the depression force to the master cylinder 41 after the brake booster 42 increases the depression force by the difference pressure between the negative pressure and the atmospheric pressure. The master cylinder 41, to which the force increased more than the depression force is input, applies a pressure to the brake fluid in accordance with the input force and increases a master cylinder hydraulic pressure which is the hydraulic pressure of the brake fluid in the master cylinder 41.

In a case where the master cylinder hydraulic pressure increases, the pressure of the brake fluid in the hydraulic pressure path 50 connected to the master cylinder 41 also increases, and the hydraulic pressure in the hydraulic pressure path 50 becomes the same pressure as the hydraulic pressure of the master cylinder. Further, in a case where the hydraulic pressure in the hydraulic pressure path 50 increases as described above, the hydraulic pressure is transmitted also to the wheel-cylinders 71 via the master cut valves 61 and the hold valves 62 which are the normally-open solenoid valves. In the case, since the pressure reduction valves 63 are normally closed, the brake fluid in the hydraulic pressure path 50 does not flow from the hold valves 62 sides to the return paths 55 passing via the pressure reduction valves 63, and thus the hydraulic pressure transmitted from the hold valves 62 to the wheel-cylinders 71 is not reduced.

As described above, in a case where the increased hydraulic pressure is transmitted to the wheel-cylinders 71, the wheel-cylinders 71 are operated by the transmitted hydraulic pressure. That is, the wheel-cylinders 71 are operated by the hydraulic pressure of the master cylinder. In a case where the wheel-cylinders 71 operate, the wheel-cylinders 71 reduce the rotation speeds of the brake discs 75 which are disposed in combination with the wheel-cylinders 71 as well as rotate integrally with the wheels 5 when the wheels 5 rotate. As a result, since the rotation speeds of the wheels 5 are also reduced, the wheels 5 generate braking forces to a road surface and the vehicle 1 is decelerated.

As described above, since brake forces, which are forces for reducing the rotation speeds of the brake discs 75, are generated to the wheel-cylinders 71 by operating the brake pedal 22, the rotation speeds of the wheels 5 can be reduced by reducing the rotation speeds of the brake discs 75 so that the vehicle 1, which is travelling, can be braked.

Further, in a case where the brake pedal 22 is operated as described above, the stroke amount of the brake pedal 22 is detected by the brake stroke sensor 82 disposed in the vicinity of the brake pedal 22. The result of detection by the brake stroke sensor 82 is obtained by the brake stroke amount obtaining unit 93 provided with the processing unit 91 of the ECU 90. The brake device control unit 100 provided with the processing unit 91 of the ECU 90 controls the hydraulic pressures applied to the wheel-cylinders 71 by controlling the brake actuator 60 in response to the stroke amount of the brake pedal 22 obtained by the brake stroke amount obtaining unit 93 and the results of detection by the other sensors disposed to the vehicle 1.

Although the brake device control unit 100 controls the hydraulic pressures applied to the wheel-cylinders 71 in response to the stroke amount and the like of the brake pedal 22 obtained by the brake stroke amount obtaining unit 93, in a case where the stroke amount of the brake pedal 22 obtained by the brake stroke amount obtaining unit 93 abruptly increases, the brake device control unit 100 performs the brake assist control. That is, in a case where the driver abruptly depresses the brake pedal 22, the operation of the brake pedal 22 is detected by the brake stroke sensor 82 as a change of stroke amount of the brake pedal 22 and obtained by the brake stroke amount obtaining unit 93. The stroke amount of the brake pedal 22 obtained by the brake stroke amount obtaining unit 93 is transmitted to the brake assist determining unit 101 provided with the processing unit 91 of the ECU 90, and in a case where the brake assist determining unit 101 determines to perform the brake assist control, the brake device control unit 100 performs the brake assist control.

In a case where the brake assist control is performed, the brake device control unit 100 operates the pressurization pumps 64 by operating the drive motor 66. In a case where the pressurization pumps 64 are operated, the brake fluid in the return paths 55 flows in the direction of the paths between the master cut valves 61 and the hold valves 62. With the operation, the hydraulic pressure of the brake fluid which flows in the direction of the hold valves 62 is increased and the hydraulic pressures applied to the wheel-cylinders 71 are also increased. Therefore, the hydraulic pressures, which are applied to the wheel-cylinders 71, become hydraulic pressures larger than the hydraulic pressure generated when the driver depresses the brake pedal 22 in the state that the pressurization pumps 64 are not operated, and the braking force increases more than the state that the pressurization pumps 64 do not operate. As described above, in the brake assist control, in a case where hydraulic pressures, which are equal to or larger than the hydraulic pressure generated when the driver depresses the brake pedal 22 at the time the vehicle 1 is braked, are applied to the wheel-cylinders 71, the hydraulic pressures are increased by operating the pressurization pumps 64 by operating the drive motor 66.

Figure 4:
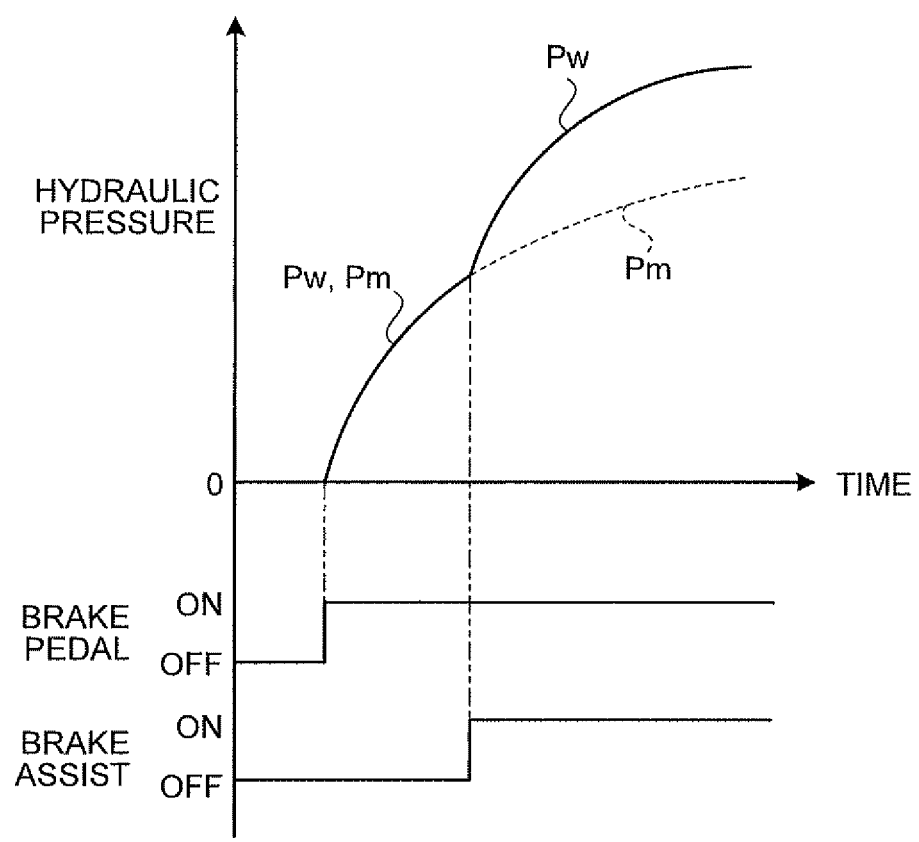
FIG. 4 is an explanatory view showing a change of hydraulic pressure in a case where a brake assist control is performed.

FIG. 4 is an explanatory view showing a change of hydraulic pressure in a case where the brake assist control is performed. In the brake assist control, the hydraulic pressures applied to the wheel-cylinders 71 are increased by operating the pressurization pumps 64 as described above, and the change of hydraulic pressure in the case will be described below. In a case where the brake pedal 22 is depressed, first, the master cylinder hydraulic pressure Pm increases. In an ordinary braking, since the brake assist control is not performed, the brake assist control is not performed at the initial stage of depression of the brake pedal 22. Therefore, brake hydraulic pressures Pw which are the hydraulic pressures applied to the wheel-cylinders 71 become pressures as large as the master cylinder hydraulic pressure Pm. As described above, in a case where the brake assist control is not performed, the master cylinder hydraulic pressure Pm is increased by depressing the brake pedal 22, and the brake hydraulic pressures Pw are also increased by the increase of the brake hydraulic pressures Pw.

In a case where the brake pedal 22 is abruptly depressed, the brake assist determining unit 101 determines to perform the brake assist control, and the brake assist control is performed, the hydraulic pressures are applied to the wheel-cylinders 71 in the state that they are increased more than the master cylinder hydraulic pressure Pm by operating the pressurization pumps 64. That is, in the brake assist control, the brake hydraulic pressures Pw are increased to the master cylinder hydraulic pressure Pm by controlling the brake actuator 60 by the brake device control unit 100 by determining the gradient when the hydraulic pressures of the brake fluid applied to the wheel-cylinders 71 are changed as a pressure increasing gradient equal to or larger than the gradient when the hydraulic pressure is increased by the brake operation of the brake pedal 22. With the operation, the braking forces generated in the wheels 5 become larger than only when the master cylinder hydraulic pressure Pm is applied to the wheel-cylinders 71, and thus the degree of deceleration of the vehicle 1 is increased.

Further, in a case where the traveling direction of the vehicle 1 is changed such as when the vehicle 1 is turned and the like, a steering operation is performed by rotating the steering wheel 20 using the steering shaft 32 as a rotation axis. In a case where the steering shaft 32 is rotated by rotating the steering wheel 20, the rotation of the steering shaft 32 is transmitted to the EPS unit 31. The EPS unit 31 is operated in response to the rotation of the steering shaft 32 and outputs a push force or a pull force to the tie-rod 35. The force, which is applied from the EPS unit 31 to the tie-rod 35, is transmitted to the knuckle arm 36 which is turned by the force. With the operation, since the front wheels 6 are also turned, the front wheels 6 rotate in a direction different from the front/rear direction of the vehicle 1, and thus the vehicle 1 performs a turn and the like by changing its traveling direction.

As described above, although the vehicle 1 turns by operating the steering wheel 20, a rudder angle, which is changed by operating the steering wheel 20, is detected by the rudder angle sensor 86 disposed to the EPS unit 31. The rudder angle detected by the rudder angle sensor 86 is transmitted to the rudder angle obtaining unit 94 provided with the processing unit 91 of the ECU 90 and obtained by the rudder angle obtaining unit 94.

In a case where the vehicle 1 turns, yaw moment, which is the rotational force of the vehicle 1 about a vertical axis, is generated to the vehicle 1. As described above, in a case where the yaw moment is generated to the vehicle 1, the yaw rate sensor 83 detects a yaw rate which is a yaw angle speed in a case where the yaw moment is generated and the vehicle 1 rotates about the vertical axis. The yaw rate detected by the yaw rate sensor 83 is transmitted to the yaw rate obtaining unit 96 provided with the processing unit 91 of the ECU 90 and obtained by the yaw rate obtaining unit 96.

Further, in a case where the vehicle 1 turns, since a centrifugal force is generated to the vehicle 1, the acceleration of the vehicle 1 in the width direction, that is, lateral G which is an acceleration in a lateral direction is generated by the centrifugal force. The lateral G, which is generated while the vehicle 1 turns as described above, is detected by the G sensor 84, and the result of detection is obtained by the G obtaining unit 97 provided with the processing unit 91 of the ECU 90.

The wheel speeds, the yaw rate, and the lateral G, which are obtained while the vehicle 1 turns, are transmitted to the yaw direction behavior estimating unit 98 provided with the processing unit 91 of the ECU 90, and the yaw direction behavior estimating unit 98 estimates a yaw direction behavior. The yaw direction behavior estimated by the yaw direction behavior estimating unit 98 is transmitted to the yaw direction behavior control determining unit 102 together with the rudder angle of the steering wheel 20 obtained while the vehicle 1 turns, and the yaw direction behavior control determining unit 102 determines whether or not the yaw direction behavior control is performed based on them. In a case where the yaw direction behavior control determining unit 102 determines to perform the yaw direction behavior control, the brake device control unit 100 performs a left/right distribution control, which is a control for reducing the yaw direction behavior, by making a difference between the braking forces generated to the left/right wheels 5.

In the left/right distribution control, the brake device control unit 100 generates a yaw direction force and stabilizes the yaw direction behavior by generating the braking force difference between the left/right wheels 5 by controlling the braking forces of the left/right wheels 5, that is, the braking forces of the left front wheel 6L and the right front wheel 6R, and the braking forces of the left rear wheel 7L and the right rear wheel 7R, respectively, by appropriately operating the drive motor 66 and the master cut valves 61, the hold valves 62, the pressure reduction valves 63. That is, the brake device control unit 100 controls the braking forces of the left/right wheels 5 so that a behavior, which is in a direction opposite the yaw direction behavior of the vehicle 1 can be generated, thereby reducing the yaw direction behavior of the vehicle 1.

In a case where, for example, the left/right distribution control is performed in the state that the driver does not perform the brake operation, the pressurization pumps 64 are operated by operating the drive motor 66, and an amount of the brake fluid, which flows from the return paths 55 in the direction of the hold valves 62, is adjusted by adjusting the opening degrees of the master cut valves 61 in the state, thereby controlling the hydraulic pressure of the brake fluid in the hydraulic pressure path 50. Further, in the left/right wheels 5, when the pressure reduction valves 63, which correspond to the wheels 5 whose braking forces are relatively reduced are opened, since the hydraulic pressures applied to the wheel-cylinders 71 are made to a different state between the wheel-cylinders 71 corresponding to the left/right wheels 5, the braking forces generated in the wheels 5 become different in the left/right wheels 5. With the operation, the yaw direction behavior generated in the vehicle 1 is reduced by generating the yaw direction behavior in the direction opposite the above yaw direction behavior of the vehicle 1. That is, in a case where the left/right distribution control is performed, the yaw direction behavior is reduced by making the difference between the braking forces generated in the left/right wheels 5 by making a difference between the hydraulic pressure for generating the braking force to the left wheels 5 and the hydraulic pressure for generating the braking force to the right wheels 5 in the left/right wheels 5.

Note that in a case where the left/right distribution control is performed as described above, it is preferable to reduce the yaw direction behavior of the vehicle 1 by controlling the difference between the braking forces of the left/right front wheels 6 which are the wheels to be steered, that is, the difference between the braking force of the left front wheel 6L and the braking force of the right front wheel 6R.

Figure 5:
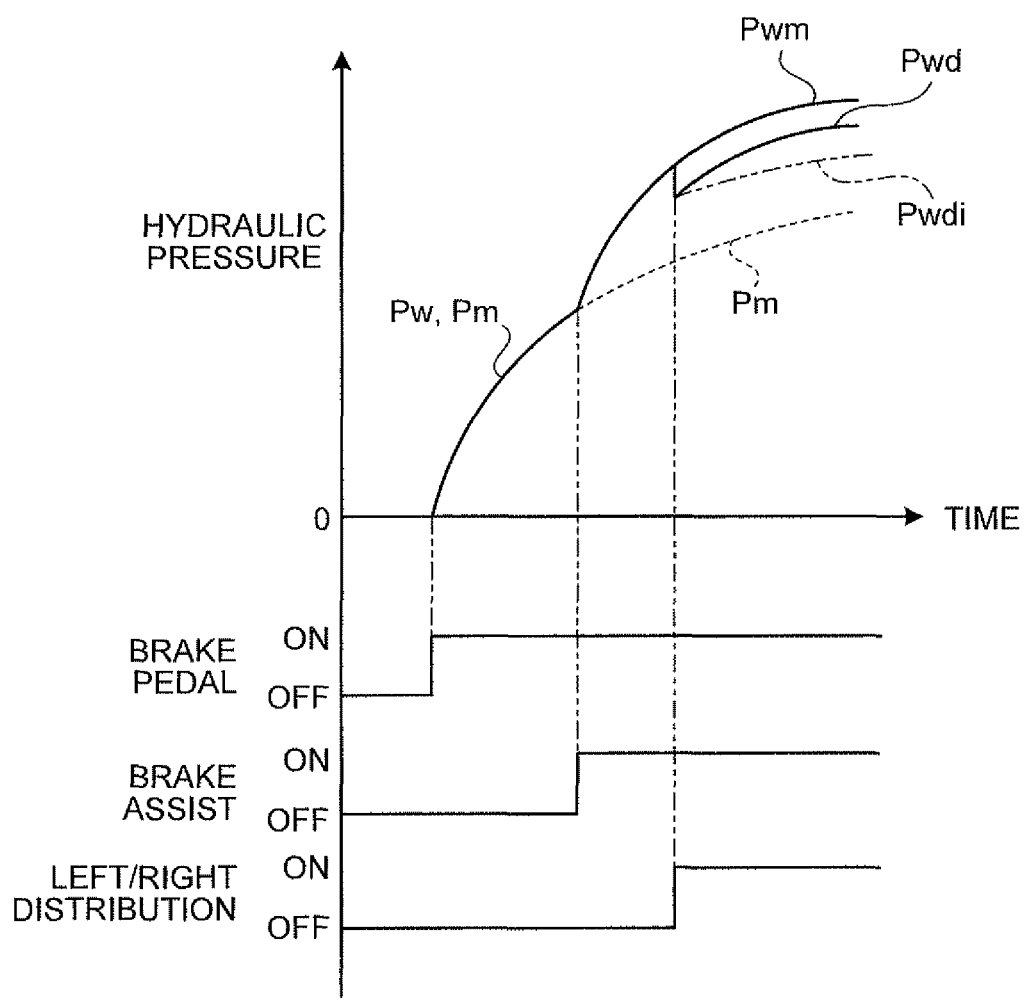
FIG. 5 is an explanatory view showing a change of hydraulic pressure in a case where a brake assist control and a left/right distribution control are performed.

FIG. 5 is an explanatory view showing a change of hydraulic pressure in a case where the brake assist control and the left/right distribution control are performed. Although the brake device control unit 100 performs the brake assist control and the left/right distribution control as described above, these controls may be performed at the same time while the vehicle 1 travels. The case in which the brake assist control and the left/right distribution control are performed at the same time as described will be explained. When the brake pedal 22 is depressed, first, the master cylinder hydraulic pressure Pm increases in the state that the brake assist control is not performed, and in the state, the brake hydraulic pressures Pw are as large as the master cylinder hydraulic pressure Pm. When the brake assist control is performed by abruptly depressing the brake pedal 22, the brake hydraulic pressures Pw are increased from the master cylinder hydraulic pressure Pm by the action of the brake actuator 60 provided with the brake device 40 and becomes larger than the master cylinder hydraulic pressure Pm.

In a case where the yaw direction behavior control determining unit 102 determines to perform the yaw direction behavior control in the state that the brake assist control is performed and the left/right distribution control is performed by the brake device control unit 100, the braking force, which is generated in, for example, one front wheel 6 of the left/right front wheels 6 in the left/right wheels 5, is reduced. In the case, the hydraulic pressure applied to one wheel-cylinder 71 of the wheel-cylinders 71 corresponding to the left/right front wheels 6 is set to a hold side brake hydraulic pressure Pwm which is a hydraulic pressure keeping the brake hydraulic pressures Pw by the brake assist control, and the hydraulic pressure applied to the other wheel-cylinder 71 is set to a pressure reduction side brake hydraulic pressure Pwd which is a hydraulic pressure more reduced than the brake hydraulic pressures Pw. That is, the hold side brake hydraulic pressure Pwm is applied to one wheel-cylinder 71 of the left front wheel wheel-cylinder 72L and the right front wheel wheel-cylinder 72R, and the pressure reduction side brake hydraulic pressure Pwd, which is the hydraulic pressure lower than the hold side brake hydraulic pressure Pwm, is applied to the other wheel-cylinder 71.

In a case where the brake assist control and the left/right distribution control are performed at the same time, although the hold side brake hydraulic pressure Pwm and the pressure reduction side brake hydraulic pressure Pwd are increased together, the degrees of increase of the hydraulic pressures at the time are set to the same degree of increase in the hold side brake hydraulic pressure Pwm and in the pressure reduction side brake hydraulic pressure Pwd. More Specifically, in a case where the brake assist control and the left/right distribution control are performed at the same time, the brake device control unit 100, which controls the hydraulic pressures applied to the wheel-cylinders 71 by controlling the brake actuator 60, determines that the hydraulic pressure, which generates a braking force to a wheel 5, of the hydraulic pressures for generating braking forces to the left/right wheels 5 has the pressure increasing gradient when the brake assist control is performed and controls the hydraulic pressure so that the hydraulic pressure has the pressure increasing gradient. With the operation, the hold side brake hydraulic pressure Pwm is controlled. Further, after the hydraulic pressure, which generates a braking force to the other wheel 5, is reduced, the hydraulic pressure is controlled based on the pressure increasing gradient which is determined as the gradient of the hold side brake hydraulic pressure Pwm which is the hydraulic pressure for generating a braking force to an opposite side wheel 5. With the operation, the pressure reduction side brake hydraulic pressure Pwd is controlled. The hold side brake hydraulic pressure Pwm and the pressure reduction side brake hydraulic pressure Pwd are increased together in the state that the difference therebetween is made to a predetermined value and the pressure increasing gradient of the hold side brake hydraulic pressure Pwm and the pressure increasing gradient of the pressure reduction side brake hydraulic pressure Pwd are made to the same pressure increasing gradient by controlling the hold side brake hydraulic pressure Pwm and the pressure reduction side brake hydraulic pressure Pwd as described above.

That is, in a case where brake controls are performed independently in the brake assist control and in the left/right distribution control, respectively, the hold side brake hydraulic pressure Pwm, and an independent control time pressure reduction side brake hydraulic pressure Pwdi, which is the brake hydraulic pressures Pw on the side where a pressure is reduced by the left/right distribution control are controlled independently in response to the yaw direction behavior. Therefore, although the pressure increasing gradients are different in the hold side brake hydraulic pressure Pwm and in the independent control time pressure reduction side brake hydraulic pressure Pwdi, in control by the vehicle stabilization controlling apparatus 2 according to the embodiment, since the brake assist control and the left/right distribution control are controlled in relation with each other, the same pressure increasing gradient is set to the hold side brake hydraulic pressure Pwm and to the pressure reduction side brake hydraulic pressure Pwd.

As described above, in a case where the brake assist control and the left/right distribution control are performed at the same time, the brake device control unit 100 makes the pressure increasing gradient when the hydraulic pressure is increased by the brake assist control to the same gradient in the hydraulic pressure for generating a braking force to the left side wheels 5 and in the hydraulic pressure for generating a braking force to the right side wheels 5 by setting the same pressure increasing gradient to the hold side brake hydraulic pressure Pwm and to the pressure reduction side brake hydraulic pressure Pwd by controlling the brake device 40. As a result, the brake device control unit 100 can generate a braking force equal to or larger than the braking force generated by the brake operation of the driver in the state that the difference between the braking forces generated by the left/right wheels 5 is made constant and thus can increase the braking forces generated to the left/right wheels 5 in the same degree.

Figure 6:
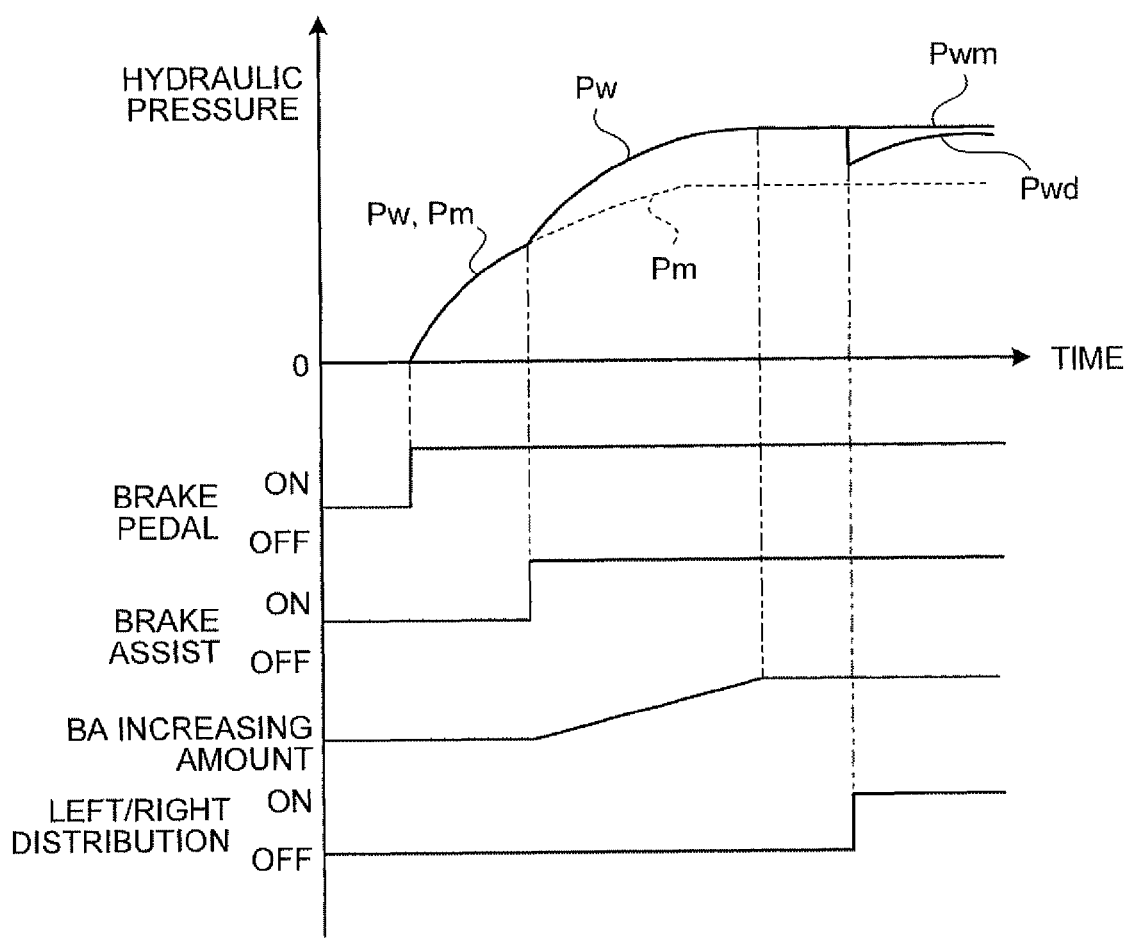
FIG. 6 is an explanatory view showing a change of hydraulic pressure in a case where the left/right distribution control is performed after a pressure increase amount reaches an upper limit value by the brake assist control.

FIG. 6 is an explanatory view showing a change of hydraulic pressure in a case where the left/right distribution control is performed after a pressure increase amount reaches an upper limit value by the brake assist control. In a case where the vehicle stabilization control is performed by the brake device 40, although the control is performed by controlling a braking force by controlling the brake hydraulic pressures Pw as described above, since the brake assist control is a control performed in emergency such as in a case in which it is necessary to perform a deceleration urgently, the pressure increase amount by the brake assist control reaches the upper limit value in short time and thus the brake hydraulic pressures Pw reach upper limit values in short time after the brake assist control starts. In a case where the left/right distribution control is performed after the pressure increase amount by the brake assist control reaches the upper limit value as described above, the hold side brake hydraulic pressure Pwm remains in the upper limit value of the brake hydraulic pressures Pw set to a predetermined value, and the pressure reduction side brake hydraulic pressure Pwd is reduced in response to the yaw direction behavior of the vehicle 1. With the operation, since the yaw direction behavior changes to a stabilizing direction, the pressure reduction side brake hydraulic pressure Pwd increases up to the upper limit value of the brake hydraulic pressures Pw as its upper limit in response to the yaw direction behavior which changes as time passes.

Figure 7:
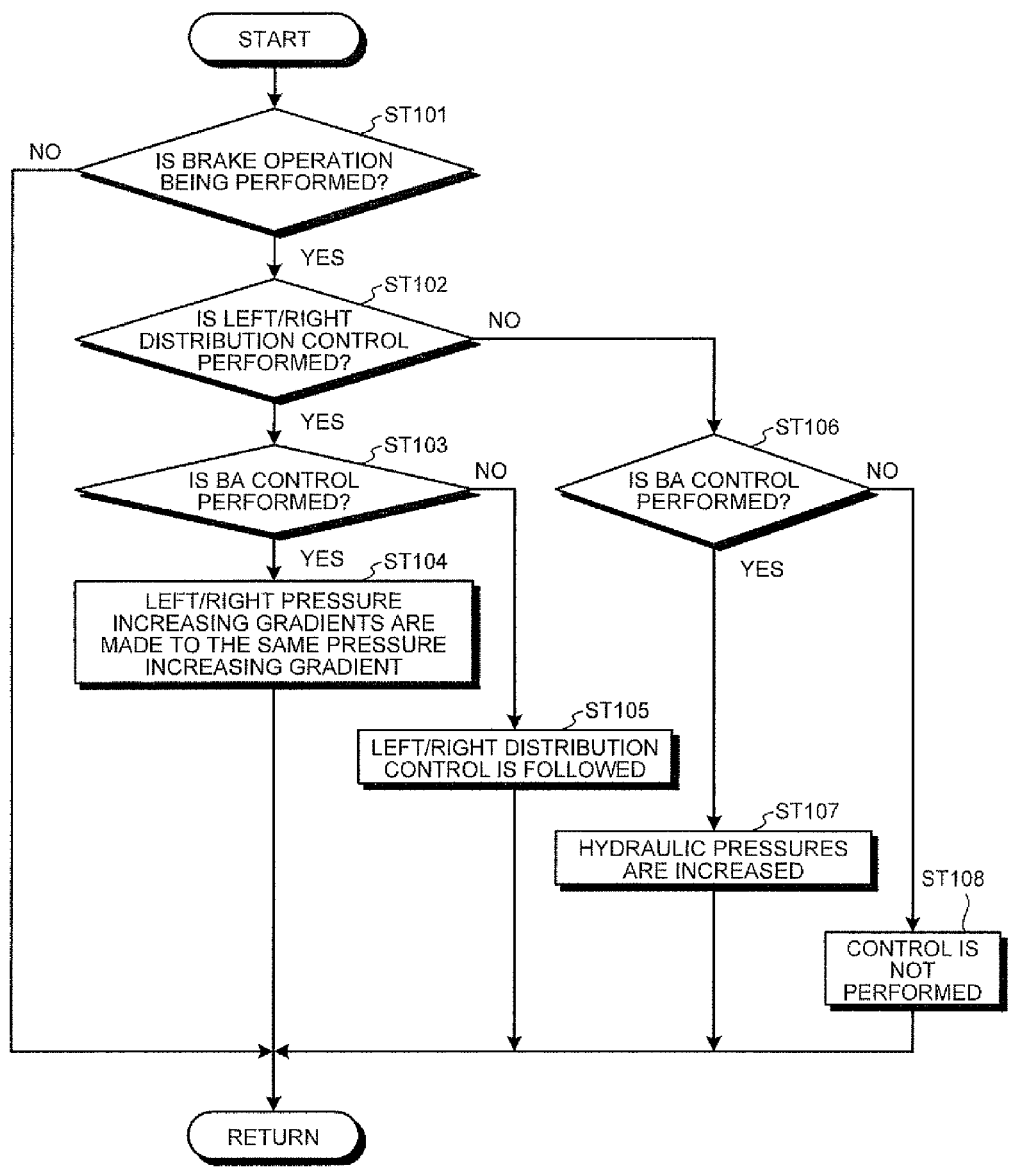
FIG. 7 is a flowchart showing a processing procedure of the vehicle stabilization controlling apparatus according to the embodiment.

FIG. 7 is a flowchart showing a processing procedure of the vehicle stabilization controlling apparatus according to the embodiment. Next, a control method of the vehicle stabilization controlling apparatus 2 according to the embodiment, that is, the processing procedure of the vehicle stabilization controlling apparatus 2 will be explained. Note that the following processes are a processing procedure before the pressure increase amount by the brake assist control reaches the upper limit value and performed by being called at predetermined period when the respective portions are controlled while the vehicle 1 travels.

In the processing procedure of the vehicle stabilization controlling apparatus 2 according to the embodiment, first, whether or not the brake operation is being performed is determined (step ST101). The determination is performed by the brake determining unit 103 provided with the processing unit 91 of the ECU 90. In a case where the stroke amount of the brake pedal 22 obtained by the brake stroke amount obtaining unit 93 is larger than 0, the brake determining unit 103 determines that the brake operation is being performed by the driver, whereas in a case where the stroke amount of the brake pedal 22 obtained by the brake stroke amount obtaining unit 93 is 0, the brake determining unit 103 determines that the driver does not perform the brake operation. In a case where it is determined by the determination in the brake determining unit 103 that the brake operation is not performed, the processing procedure is exited.

In a case where it is determined that the brake operation is being performed by the determination (step ST101) in the brake determining unit 103, next, whether or not the left/right distribution control is performed is determined (step ST102). The determination is performed by the yaw direction behavior control determining unit 102 provided with the processing unit 91 of the ECU 90. In a case where whether or not the left/right distribution control is performed is determined by the yaw direction behavior control determining unit 102, first, the yaw direction behavior of the vehicle 1 is estimated by the yaw direction behavior estimating unit 98 provided with the processing unit 91 of the ECU 90. In a case where the yaw direction behavior is estimated by the yaw direction behavior estimating unit 98, the yaw direction behavior of the vehicle 1 is estimated based on the yaw rate when the vehicle travels obtained by the yaw rate obtaining unit 96, the wheel speeds obtained by the wheel speed obtaining unit 95, and the like. The yaw direction behavior estimated by the yaw direction behavior estimating unit 98 is transmitted to the yaw direction behavior control determining unit 102 together with the rudder angle of the steering wheel 20 obtained by the rudder angle obtaining unit 94, and the yaw direction behavior control determining unit 102 determines whether or not the yaw direction behavior is stable depending on whether or not the yaw direction behavior estimated by the yaw direction behavior estimating unit 98 is a behavior suitable for the rudder angle of the steering wheel 20.

That is, the yaw direction behavior control determining unit 102 determines whether or not the yaw direction behavior is stable by comparing the yaw direction behavior estimated by the yaw direction behavior estimating unit 98 with, for example, a predetermined yaw direction behavior derived from the rudder angle of the steering wheel 20 and the vehicle speed. With the determination, in a case where the estimated yaw direction behavior is equal to or more than the predetermined yaw direction behavior derived from the rudder angle of the steering wheel 20 and the vehicle speed, the yaw direction behavior control determining unit 102 determines that the estimated yaw direction behavior does not become the behavior suitable for the rudder angle obtained by the rudder angle obtaining unit 94 and the yaw direction behavior is unstable. Note that in a case where the yaw direction behavior is derived from the rudder angle of the steering wheel 20 and the vehicle speed, the yaw direction behavior is derived referring to a map which is previously set as the relation among a rudder angle, a vehicle speed, and a yaw direction behavior and stored in the storage unit 110 of the ECU 90.

In a case where the yaw direction behavior control determining unit 102 determines that the yaw direction behavior is unstable as described above, the yaw direction behavior control determining unit 102 determines to perform a yaw direction behavior control which is a behavior control performed in a direction where the yaw direction behavior is made more stable. In a case where the yaw direction behavior control is performed by the brake device 40, since the brake device 40 is subjected to the left/right distribution control, in a case where it is determined to perform the yaw direction behavior control, it is determined to perform the left/right distribution control in the brake device 40. That is, in a case where the yaw direction behavior of the vehicle 1 is stable, the yaw direction behavior control determining unit 102 determines that the left/right distribution control is not performed, whereas in a case where the yaw direction behavior is unstable, the yaw direction behavior control determining unit 102 determines that the left/right distribution control is performed.

In a case where it is determined by the determination (step ST102) in the yaw direction behavior control determining unit 102 that the left/right distribution control is performed, next, it is determined whether or not the brake assist control (BA control) is performed (step ST103). The determination is performed by the brake assist determining unit 101 provided with the processing unit 91 of the ECU 90. The brake assist determining unit 101 determines whether or not the brake assist control is performed based on the operation speed when the driver operates the brake pedal 22. That is, in a case where the brake operation is performed at an operation speed equal to or larger than a predetermined change speed, the brake assist determining unit 101 determines to perform the brake assist control.

Specifically, the brake assist determining unit 101 determines the operation speed when the brake pedal 22 is operated using a change speed of brake stroke amount of the brake pedal 22. Therefore, the brake assist determining unit 101 continuously obtains the stroke amount of the brake pedal 22 obtained by the brake stroke amount obtaining unit 93, and in a case where the obtained increasing speed of the stroke amount is larger than a predetermined increasing speed, the brake assist determining unit 101 determines to perform the brake assist control, whereas in a case where the increasing speed of the stroke amount obtained by the brake stroke amount obtaining unit 93 is equal to or less than the predetermined increasing speed, the brake assist determining unit 101 determines not to perform the brake assist control. The predetermined increasing speed of the stroke amount, which is used to determine whether or not the brake assist control is performed, is previously set as a threshold value when it is determined whether or not the brake assist control is performed and stored in the storage unit 110 of the ECU 90.

In a case where it is determined to perform the brake assist control by the determination in the brake assist determining unit 101 (step ST103), the pressure increasing gradients of the hydraulic pressures when the hydraulic pressures are applied to the wheel-cylinders 71 are made to the same pressure increasing gradient between the wheel-cylinders 71 disposed to the left/right wheels 5 (step ST104). The hydraulic pressures applied to the wheel-cylinders 71 are controlled by the brake device control unit 100 provided with the processing unit 91 of the ECU 90.

In the case that the pressure increasing gradients are made to the same pressure increasing gradient between the wheel-cylinders 71 disposed to the left/right wheels 5 by the brake device control unit 100, in a case where the hydraulic pressure applied to the wheel-cylinder 71 of one wheel 5 of the left/right wheels 5 is not reduced by the left/right distribution control, first, the hydraulic pressure applied to the wheel-cylinder 71 disposed to the one wheel 5 is reduced once in response to the yaw direction behavior estimated by the yaw direction behavior estimating unit 98 (refer to FIG. 5, the pressure reduction side brake hydraulic pressure Pwd). In the case, the hydraulic pressure in a case where the left/right distribution control is not performed is kept by performing the brake assist control without reducing the hydraulic pressure applied to the wheel-cylinder 71 disposed to the other wheel 5 (refer to FIG. 5, the hold side brake hydraulic pressure Pwm). For example, the hydraulic pressure, which is applied to one wheel-cylinder 71 of the left front wheel wheel-cylinder 72L and the right front wheel wheel-cylinder 72R, is reduced once, and the hydraulic pressure applied to the other wheel-cylinder 71 is kept in the state that the hydraulic pressure is increased by the pressure increasing gradient when the brake assist control is performed.

After the brake device control unit 100 reduces the hydraulic pressure applied to the one wheel-cylinder 71 of the left front wheel wheel-cylinder 72L and the right front wheel wheel-cylinder 72R by the left/right distribution control as described above, the brake device control unit 100 increases the hydraulic pressure applied to the other wheel-cylinder 71 by the brake assist control based on the pressure increasing gradient of the hydraulic pressure applied to the wheel-cylinder 71 on the side where the hydraulic pressure is not reduced. With the operation, the hydraulic pressures applied to both the left/right wheel-cylinders 71 are increased by the same pressure increasing gradient. That is, the hydraulic pressures applied to both the wheel-cylinders 71 are increased by the brake assist control in the state that the difference between the hydraulic pressure applied to the left front wheel wheel-cylinder 72L and the hydraulic pressure applied to the right front wheel wheel-cylinder 72R is made constant. As described above, in a case where the brake assist control and the left/right distribution control are performed at the same time, after the hydraulic pressure, which generates a braking force to the one wheel 5 of the hydraulic pressures which generate braking forces to the left/right wheels 5, is reduced, the brake device control unit 100 makes the pressure increasing gradients of the hydraulic pressures for generating the braking forces to the left/right wheels 5 to the same pressure increasing gradient. As a result, the braking forces, which are generated to the wheels 5, are placed in the state that the braking forces are made larger than the braking force generated by the depression force when the brake pedal 22 is operated and further become braking forces capable of reducing the yaw direction behavior. After the control, which increases the hydraulic pressures applied to the wheel-cylinders 71 disposed to the left/right front wheels 6 in the same pressure increasing gradient by the brake device control unit 100, is performed, the processing procedure is exited once.

In contrast, in a case where it is determined by the determination in the brake assist determining unit 101 (step ST103) that the brake assist control is not performed, the hydraulic pressures applied to the wheel-cylinders 71 are made the hydraulic pressures depending on the left/right distribution control (step ST105). As described above, in a case where the hydraulic pressures applied to the wheel-cylinders 71 are made the hydraulic pressures depending on the left/right distribution control, the hydraulic pressure applied to the wheel-cylinders 71 are controlled by the brake device control unit 100 so that a yaw direction behavior, which is in a direction opposite the yaw direction behavior estimated by the yaw direction behavior estimating unit 98 can be generated and the yaw direction behavior of the vehicle 1 can be reduced.

Specifically, the left/right distribution control is performed to the brake device 40 by the brake device control unit 100, and the hydraulic pressure, which is applied to one wheel-cylinder 71 of the left front wheel wheel-cylinder 72L and the right front wheel wheel-cylinder 72R, is reduced based on the yaw direction behavior estimated by the yaw direction behavior estimating unit 98. With the operation, a difference is made to the braking forces between the left front wheel 6L and the right front wheel 6R, and the yaw direction behavior estimated by the yaw direction behavior estimating unit 98 is reduced. As described above, after the hydraulic pressures applied to the wheel-cylinders 71 are controlled to the hydraulic pressures depending on the left/right distribution control, the processing procedure is exited once.

In contrast, in a case where it is determined by the determination in the yaw direction behavior control determining unit 102 (step ST102) that the left/right distribution control is not performed, next, it is determined whether or not the brake assist control is performed (step ST106). The determination is performed by the brake assist determining unit 101 likewise the case in which it is determined by the determination in the yaw direction behavior control determining unit 102 (step ST102) that the left/right distribution control is performed and further it is determined whether or not the brake assist control is performed (step ST103). That is, the brake assist determining unit 101 determines whether or not the brake assist control is performed based on the change of stroke amount of the brake pedal 22 obtained by the brake stroke amount obtaining unit 93.

In a case where it is determined to perform the brake assist control by the determination in the brake assist determining unit 101 (step ST106), the hydraulic pressures applied to the wheel-cylinders 71 are increased (step ST107). The hydraulic pressures applied to the wheel-cylinders 71 are increased by the brake device control unit 100. That is, the brake device control unit 100 performs the brake assist control to the brake device 40 by determining the pressure increasing gradients of the hydraulic pressures applied to the wheel-cylinders 71 and operating the brake actuator 60 of the drive motor 66 and the like provided with the brake device 40 so that the hydraulic pressures are changed in the pressure increasing gradients. With the operation, the brake hydraulic pressures which are the hydraulic pressures applied to the wheel-cylinders 71 are increased more than the master cylinder hydraulic pressure, thereby the hydraulic pressures are increased. As described above, since the braking forces generated to the wheels 5 are made braking forces larger than the braking force generated by the depression force when the brake pedal 22 is operated by increasing the hydraulic pressures applied to the wheel-cylinders 71, the vehicle 1 is decelerated by the braking forces. After the control for increasing the hydraulic pressures applied to the wheel-cylinders 71 is performed, the processing procedure is exited once.

In contrast, in a case where it is determined not to perform the brake assist control by the determination in the brake assist determining unit 101 (step ST106), the brake device control unit 100 does not control the brake device 40 (step ST108). That is, since the brake device control unit 100 does not perform the left/right distribution control and the brake assist control to the brake device 40, the master cylinder hydraulic pressure, which is the hydraulic pressure generated by the depression force when the driver operates the brake pedal 22, is applied as the hydraulic pressures applied to the wheel-cylinders 71. With the operation, the braking forces generated to the wheels 5 become the braking force generated by the depression force when the brake pedal 22 is operated, and the vehicle 1 is decelerated by the braking force. As described above, after the braking force is generated without controlling the brake device 40, the processing procedure is exited once.

In the brake control in the vehicle stabilization controlling apparatus 2 according to the embodiment, the processes described above are called at the predetermined period and repeated until it is determined by the determination in the brake determining unit 103 (step ST101) that the brake operation is not performed.

In a case where the brake assist control and the left/right distribution control are performed at the same time, since the vehicle stabilization controlling apparatus generates the braking force equal to or larger than the braking force generated by the brake operation of the driver in the state that the difference between the braking forces generated to the left/right wheels 5 is made constant, the vehicle stabilization controlling apparatus can secure stability when the vehicle travels by the left/right distribution control while securing deceleration by the brake assist control. That is, in a case where the brake assist control and the left/right distribution control are performed at the same time, the braking forces equal to or larger than the braking force generated by the brake operation of the driver are generated to the wheels 5. Accordingly, a desired deceleration can be obtained in a case where the driver requests a large deceleration, and further since the difference is made between the braking forces generated to the left/right wheels 5, in a case where the yaw direction behavior is generated to the vehicle 1, the yaw direction behavior can be reduced by the difference between the braking forces. Further, in the case, since the left/right distribution control is performed by making the difference between the braking forces generated to the left/right wheels 5 constant while performing the brake assist control, when the left/right distribution control is performed, it can be suppressed that the difference between the braking forces of the left/right wheels 5 becomes unnecessarily large by an increase of the braking force by the brake assist control and the yaw direction behavior becomes unlikely to be reduced. As the results, stability when the vehicle travels and deceleration can be secured at the same time more reliably.

Further, in a case where the brake assist control is performed, since the braking force equal to or larger than the braking force generated by the brake operation of the driver is generated by increasing the hydraulic pressures applied to the wheel-cylinders, the braking force can be more reliably increased and the deceleration can be increased. Further, in a case where the left/right distribution control is performed, since the difference is made between the hydraulic pressure for generating the braking force to the left side wheel 5 and the hydraulic pressure for generating the braking force to the right side wheel 5 in the left/right wheels 5, that is, between the hydraulic pressure applied to the wheel-cylinder 71 disposed in the vicinity of the wheel 5 disposed on the left side of the vehicle 1 and the hydraulic pressure applied to the wheel-cylinder 71 disposed in the vicinity of the wheel 5 disposed on the right side of the vehicle 1, the difference can be more reliably made to the braking forces generated to the left/right wheels 5, and thus the yaw direction behavior can be reduced. Further, in a case where the brake assist control and the left/right distribution control are performed at the same time, since the pressure increasing gradients when the hydraulic pressures are increased by the brake assist control are made the same pressure increasing gradient between the hydraulic pressures applied to the left/right wheel-cylinders 71, when the left/right distribution control is performed, it can be suppressed that the difference between the braking forces of the left/right wheels 5 becomes unnecessarily large by increasing the hydraulic pressure by the brake assist control and the yaw direction behavior becomes unlikely to be reduced. As the results, stability when the vehicle travels and deceleration can be secured at the same time more reliably.

Further, in a case where the brake device control unit 100 performs the brake assist control and the left/right distribution control at the same time, since the brake device control unit 100 reduces the hydraulic pressure for generating the braking force to the one wheel 5 of the hydraulic pressures for generating the braking forces to the left/right wheels 5 and thereafter makes the pressure increasing gradients of the hydraulic pressures for generating the braking forces to the left/right wheels 5 to the same pressure increasing gradient, the difference can be more reliably made between the left/right wheels 5. With the operation, even in a case where the braking force is increased by the brake assist control, the yaw direction behavior can be more reliably reduced. As a result, stability when the vehicle travels and deceleration can be secured at the same time more reliably.

Further, since the front wheels 6 which are the wheels to be steered generate the yaw direction behavior by the difference between the right and left braking forces by performing the left/right distribution control by controlling the difference between the braking forces of the left front wheel 6L and the right front wheel 6R, the yaw direction behavior can be more reliably generated by the braking force difference. With the operation, in a case where the yaw direction behavior is generated to the vehicle 1, the behavior in the direction opposite the behavior is more reliably generated so that the yaw direction behavior generated in the vehicle 1 can be reduced. As a result, stability when the vehicle travels and deceleration can be secured at the same time more reliably.

Further, in a case where the brake assist control and the left/right distribution control are performed at the same time, since the hydraulic pressure is controlled by determining the pressure increasing gradient of the hydraulic pressure, which generates the braking force to the one wheel 5 of the left/right wheels 5 in the braking forces generated to the wheels 5, to the pressure increasing gradient when the brake assist control is performed, In a case where the driver requests the large deceleration, the desired deceleration can be obtained more reliably. Further, after the hydraulic pressure which generates the braking force to the other wheel 5 is reduced, since the hydraulic pressure is controlled based on the pressure increasing gradient which is determined as the gradient of the hydraulic pressure for generating the braking force to the other wheel 5, the yaw direction behavior can be reduced as well as it can be suppressed that the yaw direction behavior becomes unlikely to be reduced because the difference between the braking forces of the left/right wheels 5 becomes unnecessarily large. As the results, stability when the vehicle travels and deceleration can be secured at the same time more reliably.

Note that, in the vehicle stabilization controlling apparatus 2 according to the embodiment, when the brake assist control is not performed, the brake device 40 generates the hydraulic pressure applied to the wheel-cylinders 71 by the depression force of the driver who operates the brake pedal 22. However, even in a case where the brake assist control is not performed, the hydraulic pressure applied to the wheel-cylinders 71 may be generated by operating the brake actuator 60 of the brake device 40 by controlling the brake actuator 60 by the brake device control unit 100. In the case, in a case where the brake assist control is performed, the brake actuator 60 is controlled so that the hydraulic pressures applied to the wheel-cylinders 71 are made larger than the hydraulic pressures when the brake assist control is not performed, and when the brake assist control is performed, the hydraulic pressures applied to the wheel-cylinders 71 are increased. The brake device 40 may employ any mode as long as the mode can increase the hydraulic pressures applied to the wheel-cylinders 71 when the brake assist control is performed more than the hydraulic pressures in a case where the brake assist control is not performed and can increase the braking forces which can be generated to the wheels 5 as described above.

Further, in the vehicle stabilization controlling apparatus 2 according to the embodiment, the brake device 40 is configured as a brake device 40 which performs braking by so-called disc brakes including the wheel-cylinders 71 and the brake discs 75 in the vicinity of the wheels 5. However, the brake device 40 may be configured as a brake device 40 which performs braking by so-called drum brakes including brake drums and brake shoes in the vicinity of the wheels 5.

Industrial Applicability

As described above, the vehicle stabilization controlling apparatus according to the present invention is useful to a vehicle in which braking forces can be independently adjusted in respective wheels, and, in particular, useful when the stability of a vehicle is improved in braking.

The invention claimed is:

1. A vehicle stabilization controlling apparatus comprising:
   a yaw direction behavior estimation unit that estimates a yaw direction behavior of a vehicle;
   a brake unit capable of generating braking forces to wheels provided with the vehicle by changing hydraulic pressures of an operating fluid by a brake operation of a driver; and
   a brake unit control unit that is disposed capable of controlling the braking forces by controlling the hydraulic pressures of the operating fluid by controlling the brake unit as well as performs a brake assist control that is a control for generating the braking forces equal to or larger than the braking force generated by the brake operation by increasing the hydraulic pressures that change in response to the brake operation when the brake operation is performed at an operation speed equal to or larger than a predetermined change speed, performs a left/right distribution control that is a control for reducing the yaw direction behavior by making a difference between the braking forces generated to the left/right wheels by making a difference between the hydraulic pressure that generates the braking force to a left side wheel and the hydraulic pressure that generates the braking force to a right side wheel in the left/right wheels when the yaw direction behavior estimated by the yaw direction behavior estimate unit is equal to or larger than a predetermined behavior, and further performs a control for making pressure increasing gradients when the hydraulic pressures are increased to a same pressure increasing gradient in the hydraulic pressure for generating the braking force to the left side wheel and in the hydraulic pressure for generating the braking force to the right side wheel and for generating a braking force equal to or larger than the braking force generated by the brake operation in a state where the difference between the braking forces generated to the left/right wheels is made constant when the brake assist control and the left/right distribution control are performed at the same time.

2. The vehicle stabilization controlling apparatus according to claim 1, wherein when the brake assist control and the left/right distribution control are performed at the same time, after the hydraulic pressure, which generates the braking force to one of the left/right wheels in hydraulic pressures for generating the braking forces to the wheels, is reduced, the brake unit control unit makes the pressure increasing gradients of the hydraulic pressures for generating the braking forces to the left/right wheels to a same gradient.

* * * * *